US011310844B2

United States Patent
Comerica et al.

(10) Patent No.: US 11,310,844 B2
(45) Date of Patent: Apr. 19, 2022

(54) CAPTCHA ON WIRELESS ACCESS POINT AND HUMAN AND MACHINE USER COMPUTING DEVICE CLASSIFICATION

(71) Applicant: ARRIS Enterprises LLC, Suwanee, GA (US)

(72) Inventors: Subash Tirupachur Comerica, Sunnyvale, CA (US); Sudip Ghosal, Saratoga, CA (US); Wenge Ren, Sunnyvale, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 457 days.

(21) Appl. No.: 16/232,226

(22) Filed: Dec. 26, 2018

(65) Prior Publication Data
US 2020/0214056 A1    Jul. 2, 2020

(51) Int. Cl.
*H04W 76/11* (2018.01)
*G06F 21/81* (2013.01)
*H04L 29/06* (2006.01)

(52) U.S. Cl.
CPC ............. *H04W 76/11* (2018.02); *G06F 21/81* (2013.01); *H04L 63/0227* (2013.01); *G06F 2221/2133* (2013.01); *H04L 2463/144* (2013.01)

(58) Field of Classification Search
CPC .............................. H04W 76/11; G06F 21/81; G06F 2221/2133; H04L 63/0227; H04L 2463/144
See application file for complete search history.

(56) References Cited

U.S. PATENT DOCUMENTS

| | | | |
|---|---|---|---|
| 2014/0020067 A1 | 1/2014 | Kim et al. | |
| 2014/0366117 A1* | 12/2014 | Kumar | H04L 63/02 726/11 |
| 2016/0330235 A1 | 11/2016 | Thompson | |
| 2017/0180348 A1* | 6/2017 | Piccolotto | G06K 9/00355 |
| 2018/0109551 A1* | 4/2018 | Wetterwald | G06N 20/00 |
| 2018/0152973 A1 | 5/2018 | Ueno et al. | |

OTHER PUBLICATIONS

International Search Report dated Feb. 26, 2020 in International (PCT) Application No. PCT/US2019/067971.

* cited by examiner

*Primary Examiner* — Ashokkumar B Patel
*Assistant Examiner* — William B Jones
(74) *Attorney, Agent, or Firm* — Stewart A. Wiener; Myers Bigel, P.A.

(57) ABSTRACT

In response to receiving a primary wireless LAN connection request from a computing device, a wireless access point (WAP) establishes a temporary wireless LAN associated with a temporary service set identifier (SSID) of a computing device. WAP stores a computing device identifier of the computing device in association with the temporary SSID. WAP communicates to the computing device, a CAPTCHA challenge-response test requesting connection to the temporary wireless LAN. WAP awaits, for a timeout period, a temporary wireless LAN connection request by the computing device to communicate over the temporary wireless LAN. In response to receiving or failing to receive the temporary wireless LAN connection request from the computing device within a timeout period, WAP classifies the computing device as a human or machine user. WAP applies network policies to communications of the pending computing device over the primary wireless LAN based on the machine or human user classification.

19 Claims, 5 Drawing Sheets

| 106 | COMPUTING DEVICE CLASSIFICATION TABLE ||||
|---|---|---|---|---|
| | COMPUTING DEVICE ID | TEMPORARY SSID | COMPUTING DEVICE CLASSIFICATION | TEMP WLAN ELAPSED TIME |
| 305A | 00-00-00-00-0A  310A | TEMPWLANA  315A | HUMAN USER  320A | NULL  325A |
| 305B | 00-00-00-00-0B  310B | TEMPWLANB  315B | MACHINE USER  320B | NULL  325B |
| 305C | 00-00-00-00-0C  310C | TEMPWLANC  315C | HUMAN USER  320C | NULL  325C |
| 305D | 00-00-00-00-0D  310D | TEMPWLAND  315D | MACHINE USER  320D | NULL  325D |
| 305E | 00-00-00-00-0E  310E | TEMPWLANE  315E | NULL  320E | 14 SEC  325E |
| 305F | 00-00-00-00-0F  310F | TEMPWLANE  315F | NULL  320F | 10 SEC  325F |
| 305N | 00-00-00-00-0N  310N | TEMPWLANN  315N | NULL  320N | 5 SEC  325N |

FIG. 3

| 107 | NETWORK POLICY TABLE | | |
|---|---|---|---|
| | COMPUTING DEVICE CLASSIFICATION | NETWORK POLICY PARAMETER | NETWORK POLICY PARAMETER SETTING |
| 405A | HUMAN USER 410A | DOWNLOAD SPEED 415A | MAXIMUM OF 150 MBPS 425A |
| 405B | MACHINE USER 410B | DOWNLOAD SPEED 415B | MAXIMUM OF 64 KBPS 425B |
| 405C | HUMAN USER 410C | MULTI-LEVEL AUTHENTICATION 415C | DUAL AUTHENTICATION 425C |
| 405D | MACHINE USER 410D | MULTI-LEVEL AUTHENTICATION 415D | NONE 425D |
| 405E | HUMAN USER 410E | EXTRACT WEB BROWSING DATA 415E | YES 425E |
| 405F | MACHINE USER 410F | EXTRACT WEB BROWSING DATA 415F | NO 425F |
| 405G | HUMAN USER 410G | INTERNET ACCESS 415G | YES 425G |
| 405H | MACHINE USER 410H | INTERNET ACCESS 415H | NO 425H |

FIG. 4

```
┌─────────────────────────────────────────────────────────────────────────┐
│ Receiving, via a wireless LAN communication interface of a wireless     │
│ access point (WAP), a first primary wireless LAN connection request to  │
│ communicate over a primary wireless LAN from a first computing device   │
│ 500                                                                     │
└─────────────────────────────────────────────────────────────────────────┘
                                    │
                                    ▼
┌─────────────────────────────────────────────────────────────────────────┐
│ Establishing a first temporary wireless LAN associated with a first     │
│ temporary service set identifier (SSID) for connection with the first   │
│ computing device 510                                                    │
└─────────────────────────────────────────────────────────────────────────┘
                                    │
                                    ▼
┌─────────────────────────────────────────────────────────────────────────┐
│ Storing, in a memory of the WAP, a first computing device identifier of │
│ the first computing device in association with the first temporary      │
│ SSID 520                                                                │
└─────────────────────────────────────────────────────────────────────────┘
                                    │
                                    ▼
┌─────────────────────────────────────────────────────────────────────────┐
│ Communicating, via the wireless LAN communication interface, to the     │
│ first computing device, a first completely automated public Turing test │
│ to tell computers and humans apart (CAPTCHA) challenge-response test    │
│ requesting connection to the first temporary wireless LAN associated    │
│ with the first temporary SSID 530                                       │
└─────────────────────────────────────────────────────────────────────────┘
                                    │
                                    ▼
┌─────────────────────────────────────────────────────────────────────────┐
│ Awaiting, for a timeout period, a first temporary wireless LAN          │
│ connection request by the first computing device to communicate over    │
│ the first temporary wireless LAN 540                                    │
└─────────────────────────────────────────────────────────────────────────┘
                                    │
                                    ▼
┌─────────────────────────────────────────────────────────────────────────┐
│ In response to receiving the first temporary wireless LAN connection    │
│ request from the first computing device within the timeout period,      │
│ classifying the first computing device as a human user 550              │
└─────────────────────────────────────────────────────────────────────────┘
                                    │
                                    ▼
┌─────────────────────────────────────────────────────────────────────────┐
│ Based on the human user classification of the first computing device,   │
│ granting the first primary wireless LAN connection request to the first │
│ computing device to communicate over the primary wireless LAN 560       │
└─────────────────────────────────────────────────────────────────────────┘
                                    │
                                    ▼
┌─────────────────────────────────────────────────────────────────────────┐
│ Applying network policies to communications of the first computing      │
│ device over the primary wireless LAN based on the human user            │
│ classification 570                                                      │
└─────────────────────────────────────────────────────────────────────────┘
```

FIG. 5

CAPTCHA ON WIRELESS ACCESS POINT AND HUMAN AND MACHINE USER COMPUTING DEVICE CLASSIFICATION

TECHNICAL FIELD

The examples described herein, in general, relate to a wireless access point to implement a CAPTCHA challenge-response test to determine whether a computing device is utilized by a human or a machine user.

BACKGROUND

A captive portal is a web page that the user of a public access wireless network is obliged to view and interact with before access to the wireless network is granted. Captive portals are typically used by public wireless networks, such as in train stations, business centers, airports, hotel lobbies, coffee shops, and other venues that offer free Wi-Fi hot spots for Internet users. When a potential user first logs on to a network with a captive portal, a web page is encountered that requires certain actions before Internet access is granted. A simple captive portal forces the user to at least look at (if not read) an acceptable use policy (AUP) page, such as terms and conditions (T&C), and then click on a button indicating agreement to the terms of the policy. Machine user computing devices are unable to bypass the captive portal interface; therefor, captive portal technology does not currently allow machine user computing devices to connect to the wireless network.

In a public Wi-Fi deployment, computing devices which have earlier associated to an OPEN service set identifier (SSID), automatically start polling a captive portal without any user intervention (e.g., while being carried in the user's pocket). Such unintended captive portal network sessions hold-up precious resources on wireless access points (WAPs) and network controllers (e.g., network gateways), and slow down legitimate connections by computing devices actually attempting to connect to the WAP.

A completely automated public Turing test to tell computers and humans apart (CAPTCHA) is a type of challenge-response test used in computing to determine or not a user is a human. A common type of CAPTCHA presents a challenge to the user as an image with a sequence of obscured or distorted characters—letters and digits—on an image display (e.g., 5+2=?). If the user responds to the challenge by correctly inputting the sequence of letters or digits (i.e., solving the challenge), the system determines that the user is a human. Otherwise, the user is assumed to be a robot. It takes an average human approximately 10 seconds to solve a typical CAPTCHA challenge.

Modern text-based CAPTCHAs are designed such that they require the simultaneous use of three separate abilities—invariant recognition, segmentation, and parsing—to correctly complete the task with any consistency. First, invariant recognition refers to the ability to recognize the large amount of variation in the shapes of letters or numbers. There are nearly an infinite number of versions for each character that a human brain can successfully identify. The same is not true for a machine, and teaching the machine to recognize all those differing formations is an extremely challenging task. Segmentation, or the ability to separate one letter from another, is also made difficult in CAPTCHAs, as characters are crowded together with no white space in between. Context is also critical. The CAPTCHA must be understood holistically to correctly identify each character. For example, in one segment of a CAPTCHA, a letter might look like an "m." Only when the whole word is taken into context does it become clear that the letter is a "u" and an "n."

Applications deploy CAPTCHA to distinguish between an attacker bot and human by using captcha phrases and images. On an open Wi-Fi network like in-flight Wi-Fi and other public Wi-Fi, CAPTCHA is deployed for preventing security violations, such as denial of service (DoS) and inadvertent service activations. However, the detection and rule is applied typically at layer three or above on the open systems interconnection (OSI) networking model.

In computer networking, a wireless access point (WAP), or more generally just access point (AP), is a networking hardware device that allows a Wi-Fi device to connect to a wired network. CAPTCHA is widely implemented in websites to discriminate between humans and bot traffic. Unfortunately, WAPs currently do not implement techniques to enable discrimination between human and machine (i.e., robot) network traffic. For example, WAPs operating below layer two of the OSI model do currently distinguish between human and machine (e.g., robot) users.

SUMMARY

An example wireless access point (WAP) includes a network communication interface for communication over a wide area network (WAN) via a network gateway. The WAP further includes a wireless local area network (LAN) communication interface for communication over a primary wireless local area network (LAN) with a plurality of computing devices. The WAP further includes a processor coupled to the network communication interface and the wireless LAN communication interface; and a memory accessible to the processor. The WAP further includes completely automated public Turing test to tell computers and humans apart (CAPTCHA) programming in the memory; for example, a CAPTCHA-based programming module, stored in the memory, wherein execution of the CAPTCHA-based programming module by the processor configures the WAP to perform functions or steps of a method.

In an embodiment, execution of the CAPTCHA-based programming module by the processor configures the WAP to perform functions that include: to receive, via the wireless LAN communication interface, a first primary wireless LAN connection request to communicate over the primary wireless LAN from a first computing device. In response to receiving the first primary wireless LAN connection request, the WAP performs the following functions. First, the WAP establishes a first temporary wireless LAN associated with a first temporary service set identifier (SSID) for connection with the first computing device. Second, the WAP stores, in the memory, a first computing device identifier of the first computing device in association with the first temporary SSID. Third, the WAP communicates, via the wireless LAN communication interface, to the first computing device, a first CAPTCHA challenge-response test requesting connection to the first temporary wireless LAN associated with the first temporary SSID. Fourth, the WAP awaits, for a timeout period, a first temporary wireless LAN connection request by the first computing device to communicate over the first temporary wireless LAN. Fifth, in response to receiving the first temporary wireless LAN connection request from the first computing device within the timeout period, the WAP classifies the first computing device as a human user. Sixth, based on the human user classification of the first computing device, the WAP grants the primary wireless LAN connection request to the first computing device to communicate over the primary wireless LAN. Seventh, the WAP applies network policies to communications of the first computing device over the primary wireless LAN based on the human user classification.

An example method includes a step of receiving, via a wireless LAN communication interface of a wireless access point (WAP), a first primary wireless LAN connection request to communicate over a primary wireless LAN from a first computing device. In response to receiving the first primary wireless LAN connection request at the WAP, the following steps are implemented. First, establishing a first temporary wireless LAN associated with a first temporary service set identifier (SSID) for connection with the first computing device. Second, storing, in a memory of the WAP, a first computing device identifier of the first computing device in association with the first temporary SSID. Third, communicating, via the wireless LAN communication interface, to the first computing device, a first completely automated public Turing test to tell computers and humans apart (CAPTCHA) challenge-response test requesting connection to the first temporary wireless LAN associated with the first temporary SSID. Fourth, awaiting, for a timeout period, a first temporary wireless LAN connection request by the first computing device to communicate over the first temporary wireless LAN. Fifth, in response to receiving the first temporary wireless LAN connection request from the first computing device within the timeout period, classifying the first computing device as a human user. Sixth, based on the human user classification of the first computing device, granting the primary wireless LAN connection request to the first computing device to communicate over the primary wireless LAN. Seventh, applying network policies to communications of the first computing device over the primary wireless LAN based on the human user classification.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one of more implementations in accordance with the present teachings by way of example only, not by way of limitation. In the figures, like reference numbers refer to the same or similar elements

FIG. 5 is a flowchart of the operation of the WAP in FIG. 1, when classifying computing devices as the human or machine user.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals.

Figure 1:
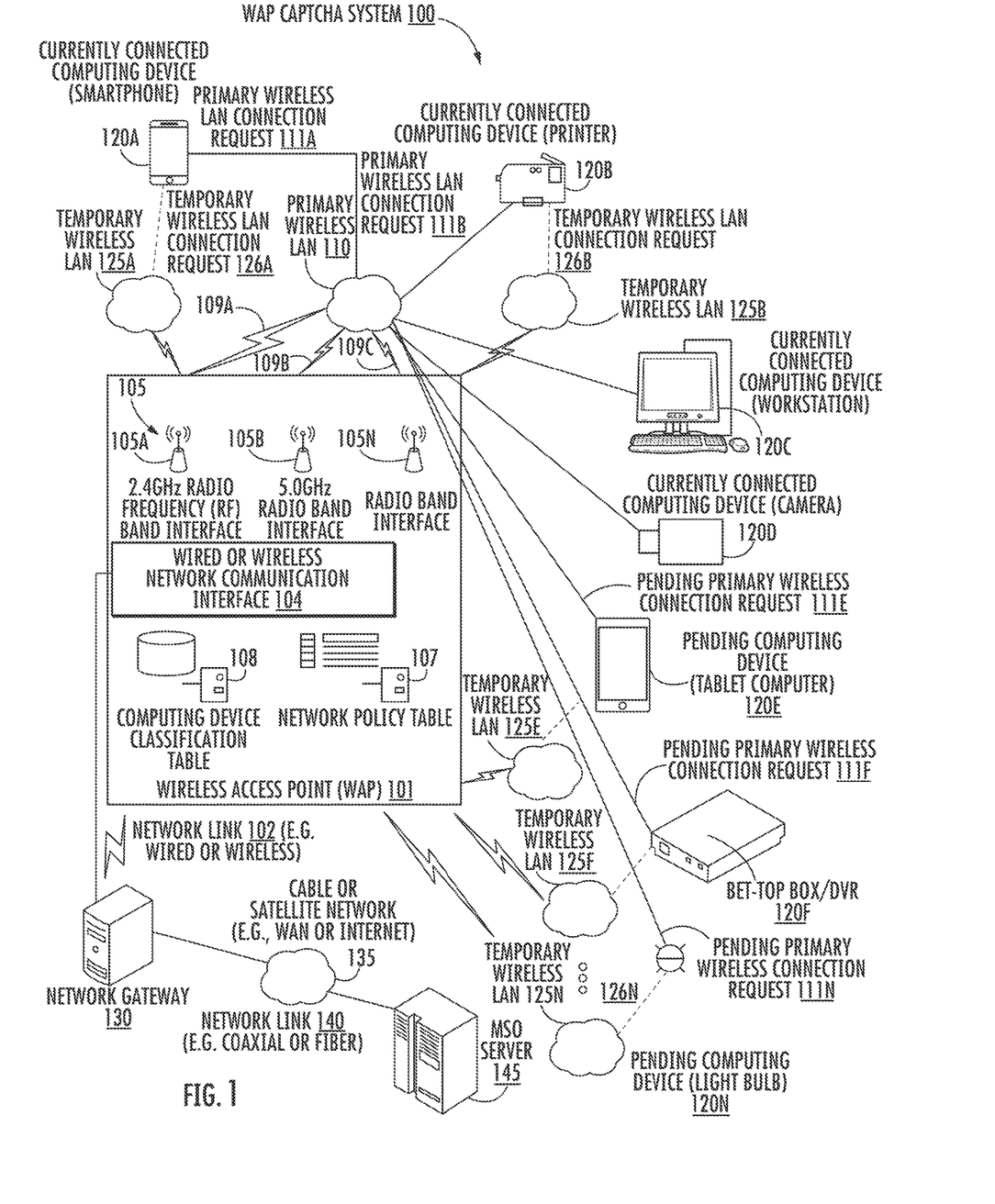
FIG. 1 is a block diagram of a WAP CAPTCHA system, which includes multiple currently connected computing devices connected to a primary wireless LAN that are classified as a human or a machine user and multiple pending computing devices connected to a respective temporary wireless LAN.

Shown in the block diagram of FIG. 1 is an example wireless access point (WAP) completely automated public Turing test to tell computers and humans apart (CAPTCHA) system 100 for CAPTCHA challenge-response testing. Because of the advent of machine to machine (M2M) Wi-Fi clients like smart devices in the home and other environments, the WAP CAPTCHA system 100 is configured to segregate Wi-Fi clients, shown as computing devices 120A-N, as human and machine clients to provide better Wi-Fi service (e.g., over the primary wireless network 110).

As will be further explained below, WAP CAPTCHA system 100 identifies a Wi-Fi subscriber network session as a machine or human initiated network session by CAPTCHA and marks the network session accordingly. Network policies can be made configurable to either segregate machine network sessions to a separate virtual LAN (VLAN) and human network sessions to other VLANs. It should be understood that VLAN is a layer 2 segregation of the primary wireless network 110. Typically, wireless access point 101 works on layer 2 Ethernet, such as 802.11 (layer 3) with IP addressing, and can segregate on layer two or layer 3 if needed. Segregation allows network policies (i.e., rules) for cost parameters, bandwidth, throughput, quality of service (QoS), etc. to be applied to computing devices 120A-N.

Identification can be done at the application layer, but the disclosed dynamic layer 2 identification can be marked to apply network policies corresponding L2/L3 services, quality of service (QoS), etc. This is achieved by dynamic and intelligent identification of user vs. machine network sessions. While a static technique can identify computing devices 120A-N based on MAC addresses to identify machine vs human Wi-Fi network sessions, such static techniques can be spoofed with MAC spoofing and other attacks to render static methods ineffective.

The example WAP CAPTCHA system 100 with dynamic identification includes a WAP 101, N computing devices 120A-N, a primary wireless LAN 110, and a network gateway 130. In some examples, the WAP 101 and the network gateway 130 may be integrated together in a single physical or logical device, such as a cable modem. In other examples, the WAP 101 and network gateway 130 may be physically or logically separate devices. Multiple currently connected computing devices 120A-D are connected to a primary wireless local area network (LAN) 110. Although Wi-Fi is used here as the example for the primary wireless LAN 110, any available two-way wireless local area network (WLAN) that is compatible with one or more standard protocols of communication implemented in wireless local area networks, such as one of the Wi-Fi standards under IEEE 802.11 and/or WiMAX may be utilized.

For example, the network gateway 130 includes a cable modem, a wired router, a network switch, a network hub, a bridge, or a combination thereof. Network gateway 130 is in communication with a multiple-system operator (MSO) server 145 and WAP 101 is in communication with the MSO server 145 via the network gateway 130. As shown, WAP 101 is in communication with network gateway 130 via a first network communication interface 104, which is wired or wireless, and transmits data communications over a network link 102 (e.g., wireless network communication interface, coaxial cable, optical fiber cable, Ethernet, etc.) to the network gateway 130. The physical network link 140 of the network gateway 130 to the MSO server 145 may be an optical fiber and/or cable link to a cable network 135 or wireless in the case of a satellite network 135. MSO server 145 receives communication signals (e.g., Internet data signals), processes the signals, and distributes the Internet data signals across the cable or satellite network 135. As shown, the example MSO server 145 is connected to a television system and Internet network, such as cable or satellite network 135—e.g., wide area network (WAN) for Internet—via the network link 140. The network link 140 can be a coaxial and/or optical connection.

In one implementation, the WAP 101 connects to a network gateway 130 (e.g., a router) via a wired network link 102 and thus WAP 101 is a standalone device, but WAP 101 can also be an integral component of the router type of network gateway 130 itself. A WAP 101 is differentiated from a hotspot, which is the physical location where Wi-Fi access to a wireless LAN is available. The WAP 101 can connect directly to a wired local area network (LAN) or a wide area network (WAN), typically via Ethernet, and the WAP 101 then provides wireless connections using wireless LAN technology, typically Wi-Fi, for other computing devices 120A-N to use that wired connection, such as network link 102. The WAP 101 supports the connection of multiple wireless computing devices through the one wired connection over network link 102.

WAP 101 further includes a wireless local area network (LAN) communication interface 105 for communication over a primary wireless local area network (LAN) 110 with a plurality of computing devices 120A-N. WAP 101 further includes a processor (element 215 of FIG. 2) coupled to the network communication interface 104 and the wireless LAN communication interface 105. WAP 101 further includes a memory (elements 220, 225 of FIG. 2) accessible to the processor (element 215 of FIG. 2). WAP 101 further includes a completely automated public Turing test to tell computers and humans apart (CAPTCHA) programming (element 230 of FIG. 2) in the memory (element 220 of FIG. 2). In the example of FIG. 1, the primary wireless LAN 110 and the first temporary wireless LAN 125A are Wi-Fi and the WAN 135 includes Internet, a telecommunication network, or a combination thereof.

Wireless LAN communication interface 105 includes a set of radio frequency (RF) band communication interfaces 105A-N. For example, RF band communication interface 105A communicates over a 2.4 Gigahertz (GHz) RF band, RF band communication interface 105B communicates over a 5 GHz RF band, and RF band communication interface 105N communicates over yet another distinct RF band, where the RF bands are non-overlapping.

Computing devices 120A-N include four currently connected computing devices 120A-D, which have respective primary wireless connection requests 111A-D granted to communicate over the primary wireless LAN 110. The four currently connected computing devices 120A-D are thus in communication with the WAP 101 and, in turn, the network gateway 130 through one of the radio frequency (RF) band communication interfaces 105A-N of the wireless LAN communication interface 105 to send and receive data over WAN 135 via the network link 102.

WAP 101 and network gateway 130 enable the computing devices 120A-N to communicate with each other over primary wireless LAN 110 and utilize services offered through the cable or satellite network 135, such as for Internet access and media content distribution. Network gateway 130 is a data device that provides access between a wide area network (WAN), such as 135, and the primary wireless LAN 110 at the premises for use by computing devices 120A-N communicating through the local on-premises primary wireless LAN 110.

WAP 101 can be a Wi-Fi access point/router that indirectly connects to the cable or satellite network 135 through the network gateway 130. However, the WAP 101 may optionally connect to the cable or satellite network 102 via a direct network link. In this example, WAP 101 may be both a Wi-Fi access point/router and the network gateway 130 that directly connects to the cable or satellite network 135. Accordingly, the WAP 101 can behave as a transport box like network gateway 130 by pushing data back to the MSO server 145. The WAP 101 and network gateway 130 provide routing, access, and other services for the end user equipment operating at the premises. WAP 101 also includes sufficient storage to support communications involving CAPTCH-challenge-response testing. As shown, the WAP 101 includes computing device classification table 106, which is depicted further in FIG. 3, for the CAPTCHA challenge-response testing. WAP 101 further includes a network policy table 107, which his depicted further in FIG. 4, to manage the network policies applied based on the human user or machine user classification of the computing devices 120A-N.

Because the respective primary wireless connection requests 111A-D have all been granted, the previously established (e.g., spawned) respective temporary wireless LANs 125A-D are decommissioned (i.e., terminated) and the respective temporary wireless connection requests 126A-D are torn down and network resources are released (and no longer held). First currently connected computing device 120A is a smartphone and is classified as a human user 320A as shown in computing device classification table 106 of FIG. 3. Second currently connected computing device 120B is a printer and is classified as a machine user 320B as shown in computing device classification table 106 of FIG. 3. Third currently connected computing device 120C is a workstation and is classified as a human user 320C as shown in computing device classification table 106 of FIG. 3. Fourth currently connected computing device 120D is an Internet camera, which is a type of digital video camera commonly employed for surveillance, and which, unlike analog closed-circuit television (CCTV) cameras, can send and receive data via a computer network and the Internet. Fourth currently connected computing device 120D is classified as a machine user 320D as shown in computing device classification table 106 of FIG. 3.

Currently connected computing devices 120A-D that are machine users, such as printer 120B or camera 120D, may only have access to a virtual (VLAN) and may be aggregated on a separate VLAN so machines are not intermixed with human traffic on the regular primary wireless LAN 110 Wi-Fi network. VLAN access, as opposed to allowing access to regular Wi-Fi may be preferred for machines. For example, an enterprise may desire not to allow machine user access to human resource (HR) and information technology (IT) networks. Whereas, with a human user, high network reliability and availability types of network policies for human network sessions are desirable.

Computing devices 120A-N further include three pending computing devices 120E-N, which have initiated (e.g., transmitted) pending primary wireless connection requests 111E-N to communicate over the primary wireless LAN 110, but those pending primary wireless connection requests 111E-N are not yet granted. None of the respective primary wireless connection requests 111E-N are granted yet and the respective temporary wireless LAN elapsed time 325E-N of FIG. 3 has not exceeded the duration of the timeout period 240 for connection. Thus, the previously spawned respective temporary wireless LANs 125E-N are still commissioned and available for connection to the respective computing devices 120E-N. If the respective pending computing devices 120E-N initiate a respective temporary wireless connection request 126E-N to connect to the respective temporary wireless LANs 125E-N within the duration of the timeout period 240, then the respective pending computing device 120E-N is classified as a human user. On the other hand, if the respective temporary wireless connection request 126E-N is not initiated within the duration of the timeout period 240, then the respective temporary wireless LAN 125E-N is no longer active and invalid (e.g., expired). In this situation, the respective pending computing device 120D-N is classified as machine user.

As shown, fifth pending computing device 120E is a tablet computer and, if the fifth pending computing device 120E initiates a respective fifth temporary wireless LAN connection 126E to connect to the fifth temporary wireless LAN 125E within the duration of the timeout period 240, the fifth pending computing device 120E will be classified as a human user 320E. Currently, the fifth temporary wireless LAN elapsed time 325E is 14 seconds as shown in the computing device classification table 106 of FIG. 3. Assuming the timeout period 240 is set to 60 seconds, then 46 seconds remain in the duration of the timeout period 240.

As shown, sixth pending computing device 120F is an optical or cable network compatible video receiver and decoder (colloquially referred to as a "set-top box") and/or a digital video recorder (DVR) as shown generally at 120F. Set-top box 120F may reside in many rooms of a building, such as a home, office, or hospital. If the sixth pending computing device 120F initiates a respective sixth temporary wireless LAN connection 126F to connect to the sixth temporary wireless LAN 125F within the duration of the timeout period 240, the sixth pending computing device 120F will be classified as a human user 320F. Currently, the sixth temporary wireless LAN elapsed time 325F is 10 seconds as shown in the computing device classification table 106 of FIG. 3. Assuming the timeout period 240 is set to 60 seconds, then 50 seconds remain in the duration of the timeout period 240.

As shown, seventh pending computing device 120N is a wireless light bulb and, if the seventh pending computing device 120N initiates a respective seventh temporary wireless LAN connection 126N to connect to the seventh temporary wireless LAN 125N within the duration of the timeout period 240, the seventh pending computing device 120N will be classified as a machine user 320N. Currently, the seventh temporary wireless LAN elapsed time 325N is 5 seconds as shown in the computing device classification table 106 of FIG. 3. Assuming the timeout period 240 is set to 60 seconds, then 55 seconds remain in the duration of the timeout period 240.

Wi-Fi onboarding environments may utilize the human user and machine user classification for different applications. In an implementation, a guest open authentication (no authentication) primary wireless LAN 110 may allow all users to connect without a captive portal that includes terms and conditions. Introducing the WAP CAPTCHA system 100 here would help classify network sessions of computing devices 120A-N so that machine network sessions can be placed on a different VLAN or segregated with no external public Internet access. In a Dot1X network session, for devices with username/password like printer/password123, again without a captive portal that includes terms and conditions or a captive-portal page, introducing the WAP CAPTCHA system 100 distinguishes between human and machine network traffic.

Another advantage of the human or machine user classification is one CAPTCHA challenge-response testing instead of many separates challenges on a per application basis. For example, Gmail and Facebook applications perform a separate human/machine check. WAP 110 can add a HTTP header (called HTTP enrichment) like HTTP-ROBOT-USER=YES or NO, based on machine or human user classification, respectively. It is then up to the application to do a secondary human/machine check if the application does not desire to rely on the HTTP enriched headers.

Figure 2:
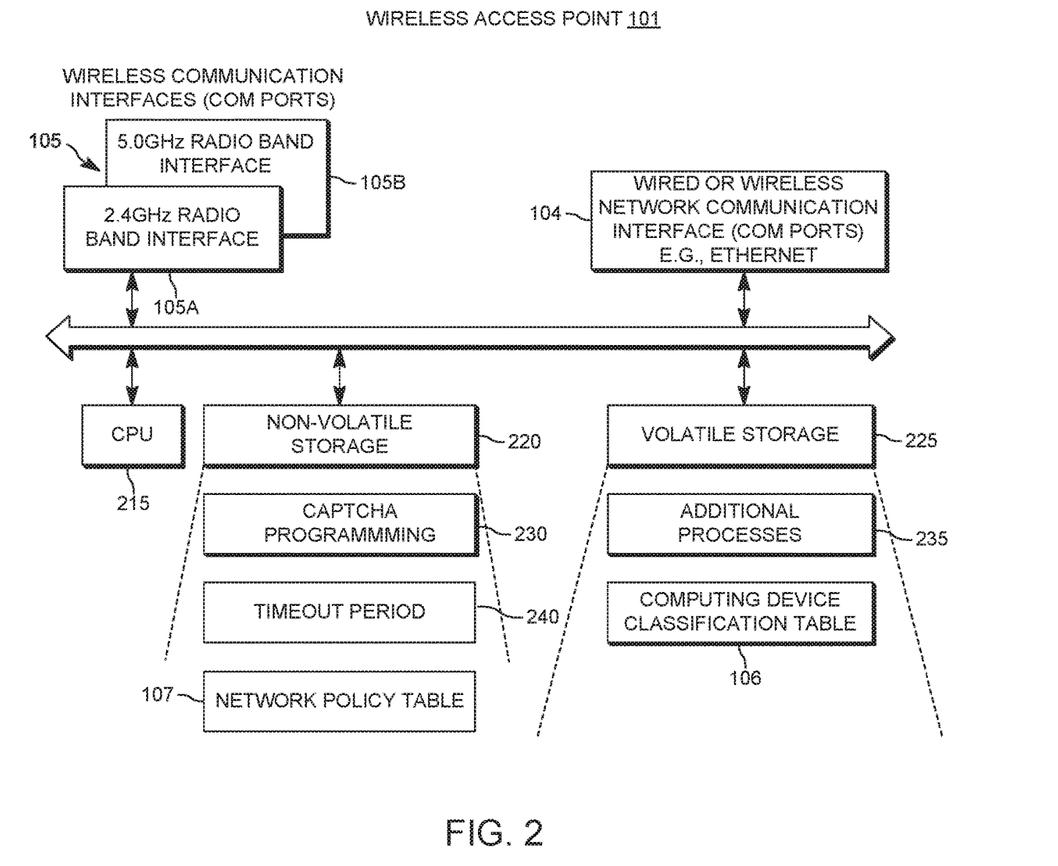
FIG. 2 shows an example of a hardware configuration for a WAP, in simplified block diagram form.

FIG. 2 shows an example of a hardware configuration for a WAP 101, in simplified block diagram form. The WAP 101 also includes circuits forming one or more processors to implement a central processing unit (CPU) 215 that controls operations of the WAP 101, including performing the processing for CAPTCHA challenge-response testing. WAP 101 may include one or more storage devices (e.g., memories) 220, 225 and/or other program and data storage devices, for example, for storing instructions executable by the CPU 215. In the example, WAP 101 includes CAPTCHA-based programming module 230 to perform the functions or procedures as described herein, a timeout period 240, a computing device classification table 106, and a network policy table 107. Specific types of working memories such as RAM, RAM, flash memory, etc. for the non-volatile storage 220 and volatile storage 225 are omitted for convenience; however, it will be appreciate that storage devices 220, 225 can include such types of memories. The WAP 101 communicates with the network gateway 130 via wired or wireless network communication interface 104 (communication ports) for communication over a wide area network (WAN) 135 via the network gateway 130. Network communication interface 104 can be wired, such as an Ethernet port. WAP 101 may communicate with computing device(s) 120A-N over primary wireless LAN 110 or temporary wireless LANs 125A-N via a wireless communication interface (communication ports) 105. Wireless communication interface 105 can include a local network adaptor, such as various wireless RF communication band interfaces 105A-N.

The network gateway 130 may be configured similar to the computing platform of the WAP 101. The MSO server 145 shown in the system of FIG. 1 may be implemented in a somewhat similar fashion as the computing platform of the WAP 101 also. Hence, the network gateway 130 and MSO server 145 include a CPU, in the form of one or more processors, for executing program instructions. Although the processor(s) forming the CPU may be similar to the processor used in the WAP 101, host or server computer platforms, such as MSO server 145 typically use somewhat different circuit architectures, e.g. to provide more processor power. Network gateway 130 and MSO server 145 also include various network communication interfaces (communication ports); and a memory, such as RAM, that is accessible to the processor to temporarily store data and execute various programming instructions. Execution of the programming by the processor configures the network gateway 130 and MSO server 145 to perform the functions or procedures as described herein.

Returning back to the WAP 101 of FIG. 2, execution of the CAPTCHA-based programming module (element 230 of FIG. 2) by the processor (element 215 of FIG. 2) configures the WAP 101 to perform functions, including to receive, via the wireless LAN communication interface 105, a first primary wireless LAN connection request 111A to communicate over the primary wireless LAN 110 from a first computing device 120A. In response to receiving the first primary wireless LAN connection request 111A, the WAP 101 performs the following functions. First, WAP 101 establishes a first temporary wireless LAN 125A associated with a first temporary service set identifier (SSID) (element 315A of FIG. 3) for connection with the first computing device 120A. Second, WAP 101 stores, in the memory 220, 225, a first computing device identifier (element 310A of FIG. 3) of the first computing device 120A in association with the first temporary SSID (element 315A of FIG. 3). Third, WAP 101 communicates, via the wireless LAN communication interface 105, to the first computing device 120A, a first CAPTCHA challenge-response test requesting connection to the first temporary wireless LAN 125A associated with the first temporary SSID (element 315A of FIG. 3). In other words, the user of the computing device 120A is asked to jump to a new wireless network for a few seconds and, if the user does so, then the user WAP CAPTCHA system 100 can ensure the user is a human user. Thus, there are two SSIDs for two wireless LANs 110, 125A and the WAP CAPTCHA system 100 displays to the user of first computing device 120A the SSID of the temporary wireless LAN 125A to jump to and tracks the first computing device 120A by its computing device identifier 310A (e.g., MAC address).

Fourth, WAP 101 awaits, for a timeout period (element 240 of FIG. 2), a first temporary wireless LAN connection request 126A by the first computing device 120A to communicate over the first temporary wireless LAN 125A. Fifth, in response to receiving the first temporary wireless LAN connection request 126A from the first computing device 120A within the timeout period (element 240 of FIG. 2), WAP 101 classifies the first computing device 120A as a human user. Sixth, based on the human user classification (element 320A of FIG. 3) of the first computing device 120A, WAP 101 grants the first primary wireless LAN connection request 111A to the first computing device 120A to communicate over the primary wireless LAN 110. Seventh, WAP 101 applies network policies (elements 405A-H of FIG. 4) to communications of the first computing device 120A over the primary wireless LAN 110 based on the human user classification (element 320A of FIG. 3). The network policies (elements 405A-H of FIG. 4) include at least one network quality of service (QoS) parameter or a network access control. Since the computing device 120A is a human user, a different set of network policies are applied to the human user vs. a machine user. A machine user, such as computing device 120B, has access to a limited subset of network services, and a human user has a full set of access to network services. Eighth, in response to granting the primary wireless LAN connection request 111A to the first computing device 120A to communicate over the primary wireless LAN 110, WAP 101 decommissions the first temporary wireless LAN 125A.

Execution of the CAPTCHA-based programming module 230 by the processor 215 further configures the WAP 101 to perform functions. First, WAP 101 transmits, via the network communication interface 104, the human user classification (element 320A of FIG. 3) to a third-party application (e.g., Gmail, Facebook, etc.) over the WAN 135. The function of transmitting the human user classification (element 320A of FIG. 3) to the third-party application over the WAN 135 includes embedding a hypertext transfer protocol (HTTP) header in an HTTP request from the first computing device 120A to the third-party application. For example, the human or machine classification can then be forwarded to Google Gmail application, and other applications and it is up to that application to determine whether to rely on the application on the human or machine user classification. Hence, instead of a per application (Gmail/Facebook) doing a human/machine check, the WAP 101 adds an HTTP header (called HTTP enrichment) like HTTP-ROBOT-USER=YES or NO, based on the human or machine user classification, respectively. The application can implement a secondary human/machine check if the application does not believe in the HTTP enriched headers.

Execution of the CAPTCHA-based programming module 230 by the processor 215 further configures the WAP 101 to perform functions, including the following functions. First, receive, via the wireless LAN communication interface 105, a second primary wireless LAN connection request 111B to communicate over the primary wireless LAN 110 from a second computing device 120B. In response to receiving the second primary wireless LAN connection request 111B, the WAP 101 performs the following functions. First, WAP 101 establishes a second temporary wireless LAN 125B associated with a second temporary service set identifier (SSID) (element 315B of FIG. 3) for connection with the second computing device 120B. Second, WAP 101 stores, in the memory 220, 225, a second computing device identifier (element 310B of FIG. 3) of the second computing device 120B in association with the second temporary SSID (element 315B of FIG. 3).

Figure 3:
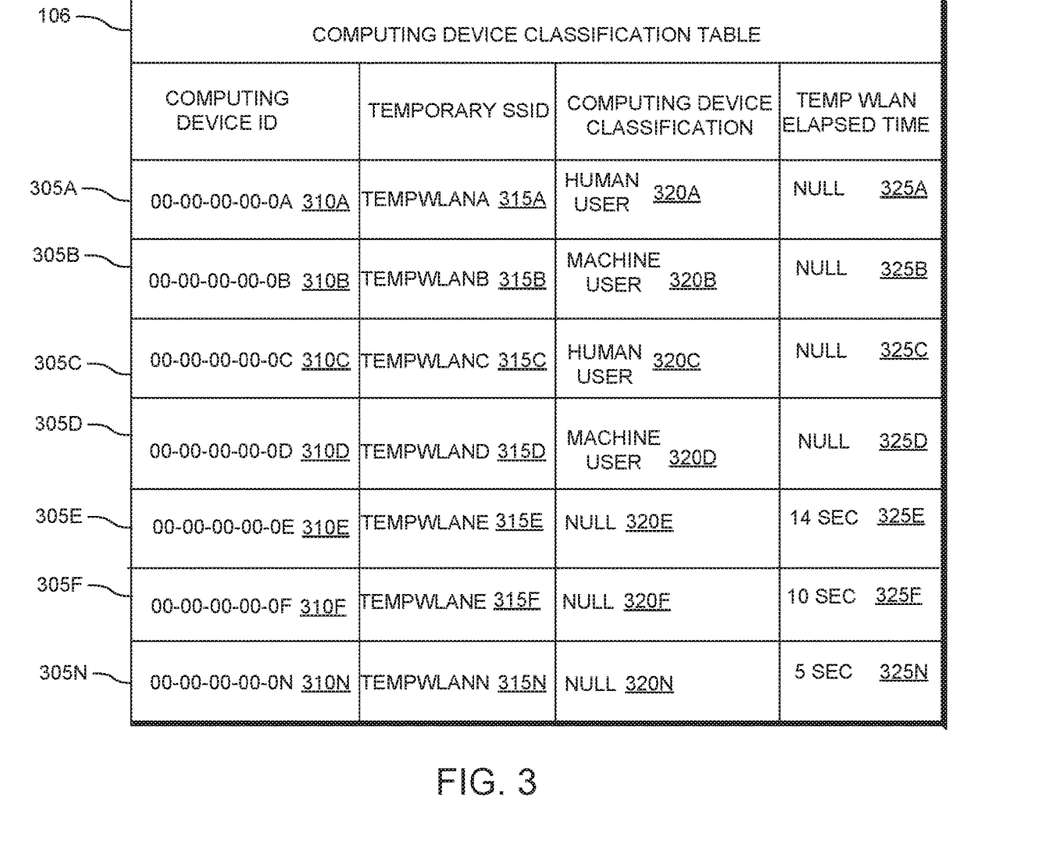
FIG. 3 shows an example of a computing device classification table, represented in a recognizable human-readable format.

Third, WAP 101 communicates, via the wireless LAN communication interface 105, to the second computing device 120B, a second CAPTCHA challenge-response test requesting connection to the second temporary wireless LAN 125B associated with the second temporary SSID (element 315B of FIG. 3). Fourth, WAP 101 awaits, for the timeout period (element 240 of FIG. 2), a second temporary wireless LAN connection request 126B by the second computing device 120B to communicate over the second temporary wireless LAN 125B. Fifth, in response to failing to receive the second temporary wireless LAN connection request 126B from the second computing device 120B within the timeout period (element 240 of FIG. 2), WAP 101 classifies the second computing device 120B as a machine user (element 320B of FIG. 3). Sixth, based on the machine user classification (element 320B of FIG. 3) of the second computing device 120B, WAP 101 grants the second primary wireless LAN connection request 111B to the second computing device 120B to communicate over the primary wireless LAN 110. Seventh, in response to granting the second primary wireless LAN connection request 111B to the second computing device 120B to communicate over the primary wireless LAN 110, WAP 101 decommissions the second temporary wireless LAN 125B. Eighth, WAP 101 applies network policies (elements 405A-H of FIG. 4) to communications of the second computing device 120B over the primary wireless LAN 110 based on the machine user classification (element 320B of FIG. 3).

FIG. 3 shows an example of a computing device classification table 106, represented in a recognizable human-readable format. The memory 220, 225 of WAP 101 further comprises the computing device classification table 106 that includes multiple computing device classification records 305A-N. Each computing device classification record 305A-N stores a respective computing device identifier 310A-N of a respective computing device 120A-N. The respective computing device identifier 310A-N is a media access control (MAC) address of the respective computing device 120A-N. Each computing device classification record 305A-N further stores a respective temporary SSID 315A-N associated with a respective temporary wireless LAN 125A-N of the respective computing device 120A-N. Each computing device classification record 305A-N further stores a respective computing device classification 320A-N for the respective computing device 120A-N indicating whether the respective computing device 120A-N is the human user or the machine user. Each computing device classification record 305A-N further stores a respective temporary wireless LAN elapsed time 325A-N to track how many seconds the respective temporary wireless LAN 125A-N has been open and awaiting connection by the respective computing device 120A-N. When the respective temporary wireless LAN elapsed time 325A-N exceeds the timeout period 240 (e.g., 60 seconds), the respective temporary wireless LAN 125A-N will be decommissioned. This is because the respective computing device 120A-N has failed the respective CAPTCHA challenge-response test and is therefore classified as the machine user.

Execution of the CAPTCHA-based programming module 230 by the processor 215 further configures the WAP 101 to perform the following functions. First, WAP 101 receives, via the wireless LAN communication interface 105, a respective primary wireless LAN connection request 111A-N to communicate over the primary wireless LAN 110 from a respective computing device 120A-N. In response to receiving the respective primary wireless LAN connection request 111A-N, WAP 101 establishes the respective temporary wireless LAN 125A-N associated with the respective temporary SSID 315A-N for connection with the respective computing device 120A-N. WAP 101 stores, in the memory 220, 225, the respective computing device identifier 310A-N and the respective temporary SSID 315A-N associated with the respective temporary wireless LAN 125A-N in the computing device classification table 106 as a respective computing device record 305A-N.

Execution of the CAPTCHA-based programming module 230 by the processor 215 further configures the WAP 101 to perform the following functions. WAP 101 awaits, for the timeout period (element 240 of FIG. 2), a respective temporary wireless LAN connection request 126A-N by the respective computing device 120A-N to communicate over the respective temporary wireless LAN 125A-N. In response to receiving or failing to receive the respective temporary wireless LAN connection request 126A-N from the respective computing device 120A-N within the timeout period (element 240 of FIG. 2), WAP 101 performs the following functions. First, WAP 101 classifies the respective computing device 120A-N as the human user or the machine user. Second, WAP 101 stores, in the memory 220, 225, the human user or the machine user classification of the respective computing device 120A-N in the computing device classification table 106 as the respective computing device classification 320A-N for the respective computing device 120A-N. Third, WAP 101 decommissions the respective temporary wireless LAN 125A-N. As used herein, "decommission" means to withdraw the temporary wireless LAN 125A-N, such that the temporary wireless LAN 125A-N is no longer accessible or visible to computing devices 120A-N for Wi-Fi connection.

Execution of the CAPTCHA-based programming module 230 by the processor 215 further configures the WAP 101 to perform the following functions. During communications of the respective computing device 120A-N over the primary wireless LAN 110, WAP 101 applies network policies (elements 405A-H of FIG. 4) to the respective computing device 120A-N based on the respective computing device classification 320A-N in the computing device classification table 106.

Figure 4:
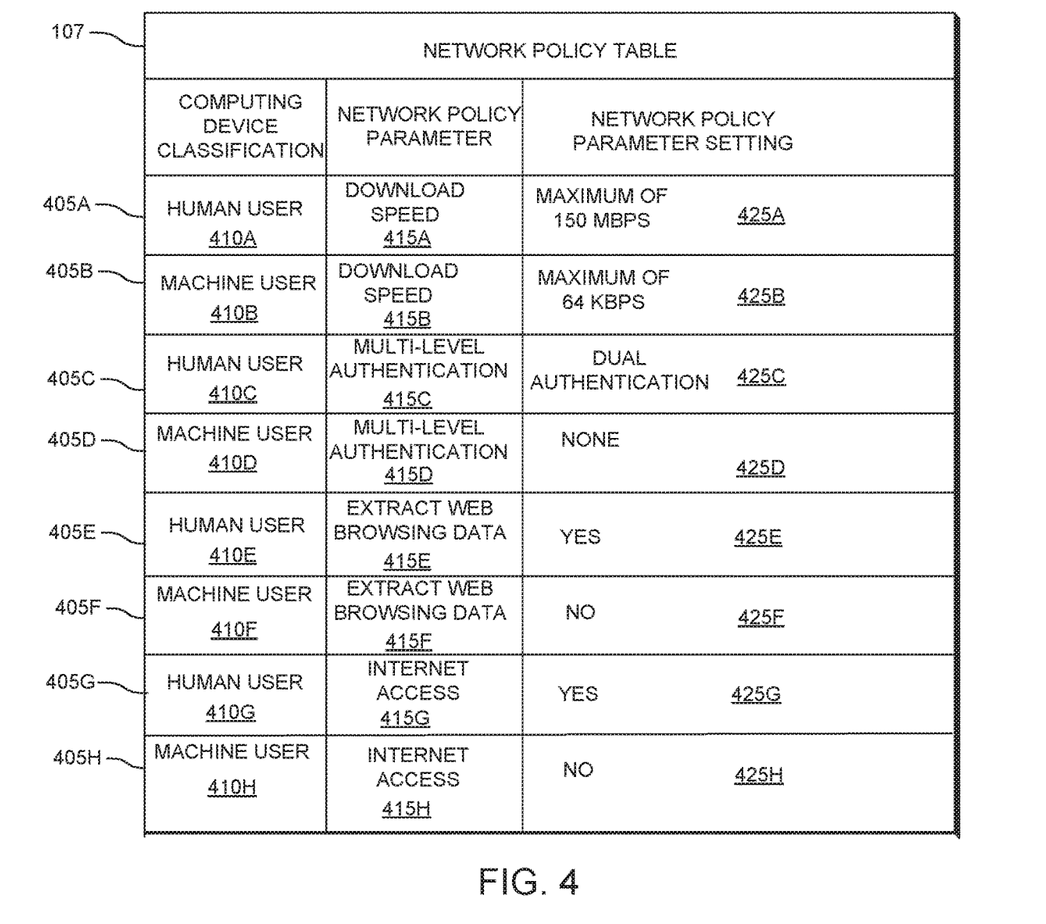
FIG. 4 shows an example of a network policy table that includes various network policies represented in a recognizable human-readable format.

FIG. 4 shows an example of a network policy table 107 that includes eight network policies arranged as eight respective network policy records 405A-H represented in a recognizable human-readable format. As shown, each respective network policy record 405A-H stores a respective computing device classification 410A-H (e.g., human user or machine user) to which the respective network policy applies. Second, each respective network policy record 405A-H stores a respective network policy parameter 415A-H to control, such as network Quality of Service (QoS) or network access controls. Finally, each respective network policy record 405A-H stores a respective network policy parameter setting 425A-H for the respective network policy parameter 415A-H.

Network policies, such as QoS parameters (e.g., bandwidth), can be applied to restrict machine network sessions, such as for the printer computing device 120B or camera computing device 120D of FIG. 1. On the other hand, human network sessions are more permissive and provide higher quality QoS and network access. For example, network policies are rules and, if a human network session is identified by the WAP 101, then the WAP 101 segregates to provide different sets of QoS network policies.

One network policy is: for a human user session: 150 megabits per second (Mbps) maximum download is the maximum enabled speed; and for a machine: 64 kilobits per second (Kbps). Hence, as shown, network policy record 405A, shows for a computing device classification 410A that is a human user, a 150 Mbps network policy parameter setting 425A setting for the download speed network policy parameter 415A. As shown, network policy record 405B, shows for a computing device classification 410B that is a machine user, a 64 Kbps maximum network policy parameter setting 425B setting for the download speed network policy parameter 415B.

Another network policy is for a human user network session: multi-level authentication, such as dual or three-factor authentication is required. But for a machine user network session: multi-level authentication is not required. Hence, as shown, network policy record 405C, shows for a computing device classification 410C that is a human user, a dual authentication network policy parameter setting 425C setting for the multi-level authentication network policy parameter 415C. As shown, network policy record 405D, shows for a computing device classification 410D that is a machine user, a none setting for the multi-level authentication network policy parameter setting 425D for the multi-level network policy parameter 415D.

Yet another network policy is for a human user network session: extract human browsing data for advertising targeting purposes to do analytics because for a human user, access is provided to the Internet. For a machine user: no browsing data is extracted because for a machine user, no Internet is provided. Hence, as shown, network policy record 405E, shows for a computing device classification 410E that is a human user, a yes network policy parameter setting 425E setting. As shown, network policy record 405F, shows for a computing device classification 410F that is a machine user, a no setting for the extract web browsing data network policy parameter setting 425F for the extract web browsing data network policy parameter 415F.

FIG. 5 is a flowchart of the operation of the WAP 101 in FIG. 1, when classifying computing devices 120A-N as the human or machine user. Because the WAP 101 can easily spawn a new Wi-Fi network, the WAP 101 opens a temporary wireless LAN 125A-N with a temporary SSID 315A-N and tracks the computing device 120A-N by a computing device identifier 305A-N, such as MAC address. If the MAC address of the computing device 120A-N being tracked hits the temporary wireless network 125A-N associated with the temporary SSID 315A-N, then when the computing device 120A-N reverts back to the primary wireless LAN 110, network policies for a human user are applied. This is done to distinguish between humans and machines or bot users. Because the Internet Protocol (IP) address (OSI model layer 3) of the computing device 120A-N will change, network session marking can be done on layer two (Ethernet). Hence the user of the computing device 120A-N is tracked based on OSI model layer 2 information (MAC address).

Beginning in block 500, WAP 101 receives, via a wireless LAN communication interface 105 of the WAP 101, a first primary wireless LAN connection request 111A to communicate over a primary wireless LAN 110 from a first computing device 120A. In response to receiving the first primary wireless LAN connection request 111A at the WAP 101, the WAP 101 proceeds to execute blocks 510-570.

Proceeding to block 510, WAP 101 establishes a first temporary wireless LAN 125A associated with a first temporary service set identifier (SSID) for connection with the first computing device 120A. Moving to block 520, WAP 101 stores, in a memory 220, 225 of the WAP 101, a first computing device identifier (element 310A of FIG. 3) of the first computing device 120A in association with the first temporary SSID (element 315A of FIG. 3). Continuing to block 530, WAP 101 communicates, via the wireless LAN communication interface 105, to the first computing device 120A, a first completely automated public Turing test to tell computers and humans apart (CAPTCHA) challenge-response test requesting connection to the first temporary wireless LAN 125A associated with the first temporary SSID (element 315A of FIG. 3).

In block 540, WAP 101 awaits, for a timeout period (element 240 of FIG. 2), a first temporary wireless LAN connection request 126A by the first computing device 120A to communicate over the first temporary wireless LAN 125A. Proceeding to block 550, in response to receiving the first temporary wireless LAN connection request 126A from the first computing device 120A within the timeout period (element 240 of FIG. 2), WAP 101 classifies the first computing device 120A as a human user.

Moving to block 560, based on the human user classification (element 320A of FIG. 3) of the first computing device 120A, WAP 101 grants the primary wireless LAN connection request 111A to the first computing device 120A to communicate over the primary wireless LAN 110. Finishing now in block 570, WAP 101 applies network policies (elements 405A-H of FIG. 4) to communications of the first computing device 120A over the primary wireless LAN 110 based on the human user classification (element 320A of FIG. 3).

In one example, in response to granting the first primary wireless LAN connection request 111A to the first computing device 120A to communicate over the primary wireless LAN 110, WAP 101 decommissions the first temporary wireless LAN 125A. WAP 101 also transmits, via a network communication interface 104 of the WAP 101, the human user classification (element 320A of FIG. 3) to a third-party application over a wide area network (WAN) 135. Transmitting the human user classification (element 320A of FIG. 3) to the third-party application over the WAN 135 includes embedding a hypertext transfer protocol (HTTP) header in an HTTP request from the first computing device 120A to the third-party application.

In an implementation, WAP 101 receives, via the wireless LAN communication interface 105 of the WAP 101, a second primary wireless LAN connection request 111B to communicate over the primary wireless LAN 110 from a second computing device 120B. In response to receiving the second primary wireless LAN connection request 111B at the WAP 101, WAP 101 implements the following. First, WAP 101 establishes a second temporary wireless LAN 125B associated with a second temporary service set identifier (SSID) for connection with the second computing device 120B. Second, WAP 101 stores, in the memory 220, 225 of the WAP 101, a second computing device identifier (element 310B of FIG. 3) of the second computing device 120B in association with the second temporary SSID (element 315B of FIG. 3). Third, WAP 101 communicates, via the wireless LAN communication interface 105, to the second computing device 120B, a second CAPTCHA challenge-response test requesting connection to the second temporary wireless LAN 125B associated with the second temporary SSID (element 315B of FIG. 3).

Fourth, WAP 101 awaits, for the timeout period (element 240 of FIG. 2), a second temporary wireless LAN connection request 126B by the second computing device 120B to communicate over the second temporary wireless LAN 125B. Fifth, in response to failing to receive the second temporary wireless LAN connection request 126B from the second computing device 120B within the timeout period (element 240 of FIG. 2), WAP 101 classifies the second computing device 120B as a machine user (element 320B of FIG. 3). Sixth, based on the machine user classification (element 320B of FIG. 3) of the second computing device 120B, WAP 101 grants the second primary wireless LAN connection request 111B to the second computing device 120B to communicate over the primary wireless LAN 110. Seventh, in response to granting the second primary wireless LAN connection request 111B to the second computing device 120B to communicate over the primary wireless LAN 110, WAP 101 decommissions the second temporary wireless LAN 125B. Eighth, WAP 101 applies network policies (elements 405A-H of FIG. 4) to communications of the second computing device 120B over the primary wireless LAN 110 based on the machine user classification.

In one implementation, the memory 220, 225 of the WAP 101 includes a computing device classification table 106 that includes multiple computing device classification records 305A-N. Each computing device classification record 305A-N stores a respective computing device identifier 310A-N of a respective computing device 120A-N. The respective computing device identifier 310A-N is a media access control (MAC) address of the respective computing device 120A-N. Each computing device classification record 305A-N further stores a respective temporary SSID 315A-N associated with a respective temporary wireless LAN 125A-N of the respective computing device 120A-N. Computing device classification record 305A-N further stores a respective computing device classification 320A-N for the respective computing device 120A-N indicating whether the respective computing device 120A-N is the human user or the machine user.

WAP 101 receives, via the wireless LAN communication interface 105 of the WAP 101, a respective primary wireless LAN connection request 111A-N to communicate over the primary wireless LAN 110 from a respective computing device 120A-N. In response to receiving the respective primary wireless LAN connection request 111A-N, WAP 101 implements the following steps. First, WAP 101 establishes the respective temporary wireless LAN 125A-N associated with the respective temporary SSID 315A-N for connection with the respective computing device 120A-N. Second, WAP 101 stores, in the memory 220, 225 of the WAP 101, the respective computing device identifier 310A-N and the respective temporary SSID 315A-N associated with the respective temporary wireless LAN 125A-N in the computing device classification table 106 as a respective computing device record 305A-N.

WAP 101 awaits, for the timeout period (element 240 of FIG. 2), a respective temporary wireless LAN connection request 126A-N by the respective computing device 120A-N to communicate over the respective temporary wireless LAN 125A-N. In response to receiving or failing to receive the respective temporary wireless LAN connection request 126A-N from the respective computing device 120A-N within the timeout period (element 240 of FIG. 2), WAP 101 implements the following steps. First, WAP 101 classifies the respective computing device 120A-N as the human user or the machine user. Second, WAP 101 stores, in the memory 220, 225 of the WAP 101, the human user or the machine user classification of the respective computing device 120A-N in the computing device classification table 106 as the respective computing device classification 320A-N for the respective computing device 120A-N. Third, WAP 101 decommissions the respective temporary wireless LAN 125A-N. During communications of the respective computing device 120A-N over the primary wireless LAN 110, WAP 101 applies network policies (elements 405A-H of FIG. 4) to the respective computing device 120A-N based on the respective computing device classification 320A-N in the computing device classification table 106.

Any of the WAP CAPTCHA functionality described herein for the WAP 101, network gateway 130, computing devices 120A-N, MSO server 145, or other components of the WAP CAPTCHA system 100 can be embodied in programming, such as one more applications, as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

In general, the term "programming," or " application" as used herein (e.g., CAPTCHA-based programming module 230), refers to logic embodied in hardware or software instructions, which can be written in a programming language, such as Java™, C, C++, C#, or firmware for example. Programming or a software application can be compiled into executable programs or written in interpreted programming languages, such as Perl, Visual Basic script, HTML, or JavaScript. Software applications may be callable from other applications. Generally, applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

A server platform, such as MSO server 145 typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The computing devices 120A-N of FIG. 1, such as a human user classified computing device 120A-N such as a PC, workstation, smartphone, laptop computer, or tablet computer includes one or more data communication interfaces (represented by COM ports), circuits forming one or more processors to implement a central processing unit (CPU) functionality, main memory and one or more mass storage devices for storing user data and the various executable programs for CAPTCHA challenge-response testing controls. A machine user classified computing device 120A-N may include similar elements, but may typically use smaller components that also require less power, to facilitate implementation in a portable form factor. The various types of computing devices 120A-N will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such computing devices 120A-N also are conventional in nature. Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files.

"Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless access point (WAP) comprising:
a network communication interface, for communication over a wide area network (WAN) via a network gateway;
a wireless local area network (LAN) communication interface, for communication over a primary wireless local area network (LAN) with a plurality of computing devices;
a processor, coupled to the network communication interface and the wireless LAN communication interface;
a memory, accessible to the processor; and
a completely automated public Turing test to tell computers and humans apart (CAPTCHA)-based programming module, stored in the memory, wherein execution of the CAPTCHA-based programming module by the processor configures the WAP to:
receive, via the wireless LAN communication interface, a first primary wireless LAN connection request to communicate over the primary wireless LAN from a first computing device;
in response to receiving the first primary wireless LAN connection request:
establish a first temporary wireless LAN associated with a first temporary service set identifier (SSID) for connection with the first computing device;
store, in the memory, a first computing device identifier of the first computing device in association with the first temporary SSID;
communicate, via the wireless LAN communication interface, to the first computing device, a first CAPTCHA challenge-response test requesting connection to the first temporary wireless LAN associated with the first temporary SSID;
await, for a timeout period, a first temporary wireless LAN connection request by the first computing device to communicate over the first temporary wireless LAN;
in response to receiving the first temporary wireless LAN connection request from the first computing device within the timeout period, generate a classification of the first computing device as having a human user;
based on the classification of the first computing device as having a human user, grant the first primary wireless LAN connection request to the first computing device to communicate over the primary wireless LAN; and
apply network policies to communications of the first computing device over the primary wireless LAN based on the classification of the first computing device as having a human user.

2. The WAP of claim 1, wherein execution of the CAPTCHA-based programming module by the processor further configures the WAP to:
in response to granting the primary wireless LAN connection request to the first computing device to communicate over the primary wireless LAN, decommission the first temporary wireless LAN; and
transmit, via the wired network communication interface, to a third-party application over the WAN, the classification of the first computing device as having a human user.

3. The WAP of claim 2, wherein:
to transmit, to a third-party application over the WAN, the classification of the first computing device as having a human user, further comprises embedding a hypertext transfer protocol (HTTP) header in an HTTP request from the first computing device to the third-party application.

4. The WAP of claim 1, wherein execution of the CAPTCHA-based programming module by the processor further configures the WAP to:
receive, via the wireless LAN communication interface, a second primary wireless LAN connection request to communicate over the primary wireless LAN from a second computing device; and
in response to receiving the second primary wireless LAN connection request:
establish a second temporary wireless LAN associated with a second temporary service set identifier (SSID) for connection with the second computing device;
store, in the memory, a second computing device identifier of the second computing device in association with the second temporary SSID;
communicate, via the wireless LAN communication interface, to the second computing device, a second CAPTCHA challenge-response test requesting connection to the second temporary wireless LAN associated with the second temporary SSID;
await, for the timeout period, a second temporary wireless LAN connection request by the second computing device to communicate over the second temporary wireless LAN;
in response to failing to receive the second temporary wireless LAN connection request from the second computing device within the timeout period, generate a classification of the second computing device as having a machine user;
based on the classification of the second computing device as having a machine user, grant the second primary wireless LAN connection request to the second computing device to communicate over the primary wireless LAN;
in response to granting the second primary wireless LAN connection request to the second computing device to communicate over the primary wireless LAN, decommission the second temporary wireless LAN; and
apply network policies to communications of the second computing device over the primary wireless LAN based on the machine user classification.

5. The WAP of claim 1, wherein the memory further stores:
a computing device classification table that includes multiple computing device classification records, each computing device classification record comprising:
a respective computing device identifier of a respective computing device;
a respective temporary SSID associated with a respective temporary wireless LAN of the respective computing device; and
a respective computing device classification for the respective computing device indicating whether the respective computing device is classified as having the human user or the machine user.

6. The WAP of claim 5, wherein execution of the CAPTCHA-based programming module by the processor further configures the WAP to:
receive, via the wireless LAN communication interface, a respective primary wireless LAN connection request to communicate over the primary wireless LAN from a respective computing device; and in response to receiving the respective primary wireless LAN connection request:
establish the respective temporary wireless LAN associated with the respective temporary SSID for connection with the respective computing device; and
store, in the memory, the respective computing device identifier and the respective temporary SSID associated with the respective temporary wireless LAN in the computing device classification table as a respective computing device record.

7. The WAP of claim 6, wherein execution of the CAPTCHA-based programming module by the processor further configures the WAP to:
await, for the timeout period, a respective temporary wireless LAN connection request by the respective computing device to communicate over the respective temporary wireless LAN; and
in response to receiving or failing to receive the respective temporary wireless LAN connection request from the respective computing device within the timeout period:
generate the classification of the respective computing device as having one of the human user or the machine user;
store, in the memory, the classification of the respective computing device in the computing device classification table as the respective computing device classification for the respective computing device; and
decommission the respective temporary wireless LAN.

8. The WAP of claim 7, wherein execution of the CAPTCHA-based programming module by the processor further configures the WAP to:
apply network policies, during communications of the respective computing device over the primary wireless LAN, to the respective computing device based on the respective computing device classification in the computing device classification table.

9. The WAP of claim 5, wherein the respective computing device identifier is a media access control (MAC) address of the respective computing device.

10. The WAP of claim 1, wherein the wireless primary LAN and the first temporary wireless LAN is Wi-Fi; and wherein the WAN includes: internet, a telecommunication network, or a combination thereof.

11. A method comprising:
receiving, via a wireless LAN communication interface of a wireless access point (WAP), a first primary wireless LAN connection request to communicate over a primary wireless LAN from a first computing device; and
in response to receiving the first primary wireless LAN connection request at the WAP:
establishing a first temporary wireless LAN associated with a first temporary service set identifier (SSID) for connection with the first computing device;
storing, in a memory of the WAP, a first computing device identifier of the first computing device in association with the first temporary SSID;
communicating, via the wireless LAN communication interface, to the first computing device, a first completely automated public Turing test to tell computers and humans apart (CAPTCHA) challenge-response test requesting connection to the first temporary wireless LAN associated with the first temporary SSID;
awaiting, for a timeout period, a first temporary wireless LAN connection request by the first computing device to communicate over the first temporary wireless LAN;
in response to receiving the first temporary wireless LAN connection request from the first computing device within the timeout period, classifying the first computing device as a human user;
based on the human user classification of the first computing device, granting the first primary wireless LAN connection request to the first computing device to communicate over the primary wireless LAN; and
applying network policies to communications of the first computing device over the primary wireless LAN based on the human user classification.

12. The method of claim 11, further comprising:
in response to granting the first primary wireless LAN connection request to the first computing device to communicate over the primary wireless LAN, decommissioning the first temporary wireless LAN; and
transmitting, via a network communication interface of the WAP, the human user classification to a third-party application over a wide area network (WAN).

13. The method of claim 12, wherein:
transmitting the human user classification to the third-party application over the WAN includes embedding a hypertext transfer protocol (HTTP) header in an HTTP request from the first computing device to the third-party application.

14. The method of claim 13, further comprising:
receiving, via the wireless LAN communication interface of the WAP, a second primary wireless LAN connection request to communicate over the primary wireless LAN from a second computing device; and
in response to receiving the second primary wireless LAN connection request at the WAP:
establishing a second temporary wireless LAN associated with a second temporary service set identifier (SSID) for connection with the second computing device;
storing, in the memory of the WAP, a second computing device identifier of the second computing device in association with the second temporary SSID;
communicating, via the wireless LAN communication interface, to the second computing device, a second CAPTCHA challenge-response test requesting connection to the second temporary wireless LAN associated with the second temporary SSID;
awaiting, for the timeout period, a second temporary wireless LAN connection request by the second computing device to communicate over the second temporary wireless LAN;
in response to failing to receive the second temporary wireless LAN connection request from the second computing device within the timeout period, generating a classification of the second computing device as having a machine user;
based on the classification of the second computing device as having a machine user, granting the second primary wireless LAN connection request to the second computing device to communicate over the primary wireless LAN;
in response to granting the second primary wireless LAN connection request to the second computing device to communicate over the primary wireless LAN, decommissioning the second temporary wireless LAN; and
applying network policies to communications of the second computing device over the primary wireless LAN based on the machine user classification.

15. The method of claim 11, wherein the memory of the WAP further stores:
a computing device classification table that includes multiple computing device classification records, each computing device classification record comprising:
a respective computing device identifier of a respective computing device;
a respective temporary SSID associated with a respective temporary wireless LAN of the respective computing device; and
a respective computing device classification for the respective computing device indicating whether the respective computing device is classified as having the human user or the machine user.

16. The method of claim 15, further comprising
receiving, via the wireless LAN communication interface of the WAP, a respective primary wireless LAN connection request to communicate over the primary wireless LAN from a respective computing device; and
in response to receiving the respective primary wireless LAN connection request:
establishing the respective temporary wireless LAN associated with the respective temporary SSID for connection with the respective computing device; and
storing, in the memory of the WAP, the respective computing device identifier and the respective temporary SSID associated with the respective temporary wireless LAN in the computing device classification table as a respective computing device record.

17. The method of claim 16, further comprising:
awaiting, for the timeout period, a respective temporary wireless LAN connection request by the respective computing device to communicate over the respective temporary wireless LAN; and
in response to receiving or failing to receive the respective temporary wireless LAN connection request from the respective computing device within the timeout period:
generating the classification of the respective computing device as having one of the human user or the machine user;
storing, in the memory of the WAP, the classification of the respective computing device in the computing device classification table as the respective computing device classification for the respective computing device; and
decommissioning the respective temporary wireless LAN.

18. The method of claim 17, further comprising:
during communications of the respective computing device over the primary wireless LAN, applying network policies to the respective computing device based on the respective computing device classification in the computing device classification table.

19. The method of claim 15, wherein the respective computing device identifier is a media access control (MAC) address of the respective computing device.

* * * * *